No. 777,844. PATENTED DEC. 20, 1904.
F. P. COX & W. H. PRATT.
METER.
APPLICATION FILED JAN. 29, 1903.
NO MODEL. 4 SHEETS—SHEET 2.

Witnesses:
Marcus L. Byng.
Helen Orford

Inventors:
Frank P. Cox,
William H. Pratt,
by Albert G. Davis
Att'y.

No. 777,844. PATENTED DEC. 20, 1904.
F. P. COX & W. H. PRATT.
METER.
APPLICATION FILED JAN. 29, 1903.
NO MODEL. 4 SHEETS—SHEET 3.
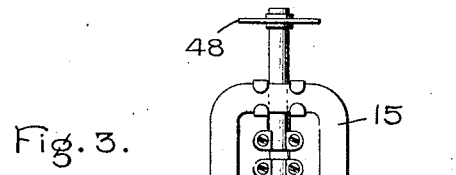
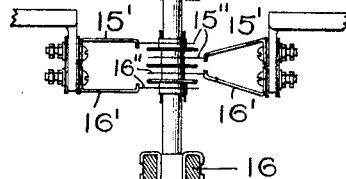
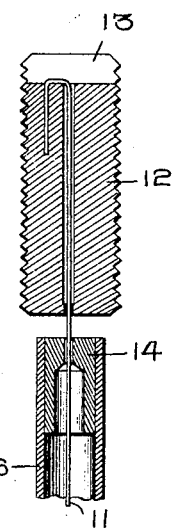
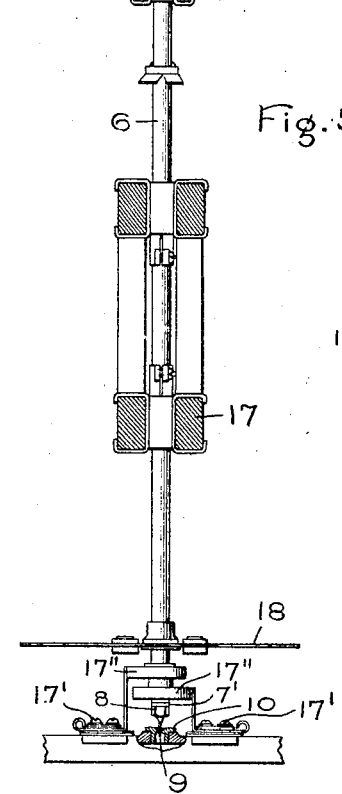
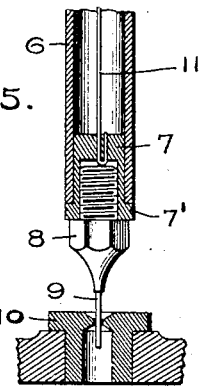
Fig. 3.
Fig. 4.
Fig. 5.
Witnesses:
Marcus L. Byng.
Helen Orford.
Inventors
Frank P. Cox,
William H. Pratt,
by Albert G. Davis
Att'y.

No. 777,844.

Patented December 20, 1904.

UNITED STATES PATENT OFFICE.

FRANK P. COX AND WILLIAM H. PRATT, OF LYNN, MASSACHUSETTS, ASSIGNORS TO GENERAL ELECTRIC COMPANY, A CORPORATION OF NEW YORK.

METER.

SPECIFICATION forming part of Letters Patent No. 777,844, dated December 20, 1904.

Application filed January 29, 1903. Serial No. 140,980.

*To all whom it may concern:*

Be it known that we, FRANK P. COX and WILLIAM H. PRATT, citizens of the United States, residing at Lynn, county of Essex, State of Massachusetts, have invented certain new and useful Improvements in Meters, of which the following is a specification.

Our invention relates to a meter intended to simultaneously measure the current flow or energy consumed in several circuits. Some of these circuits may convey direct current and others alternating current. The meter which we have hereinafter described and illustrated is more particularly intended to indicate the total energy output of a double-current generator—a machine which supplies both direct and alternating current.

The object of our invention is the production of a single, simple, and comparatively inexpensive instrument having an indicating mechanism which will accurately indicate the energy output or current flowing in two or more circuits—as, for example, one which will measure the total energy output of double-current generators.

Our invention consists in certain features of construction and arrangement more particularly hereinafter pointed out in the claims annexed to and forming a part of this specification.

Figure 1:
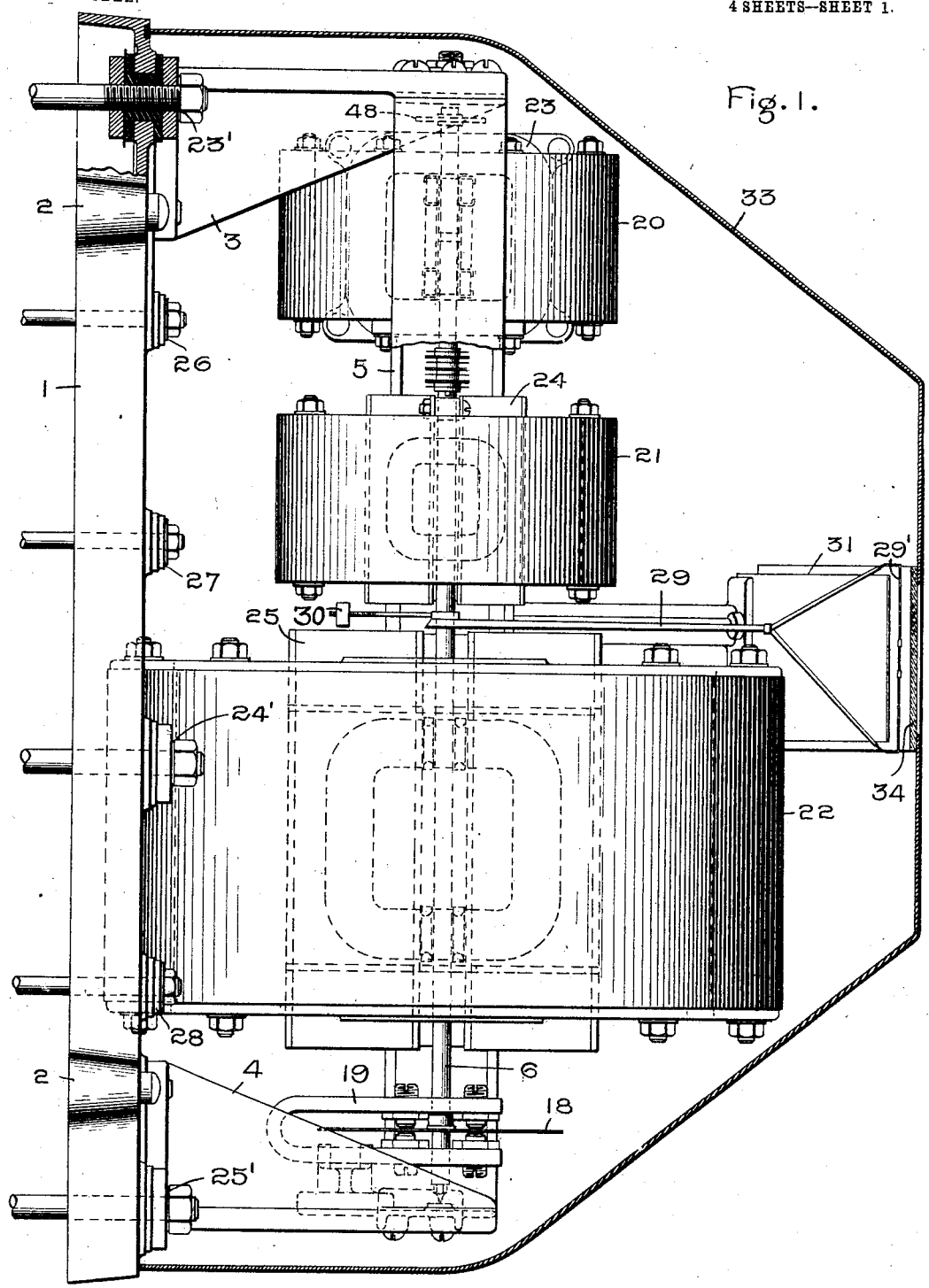
Figure 2:
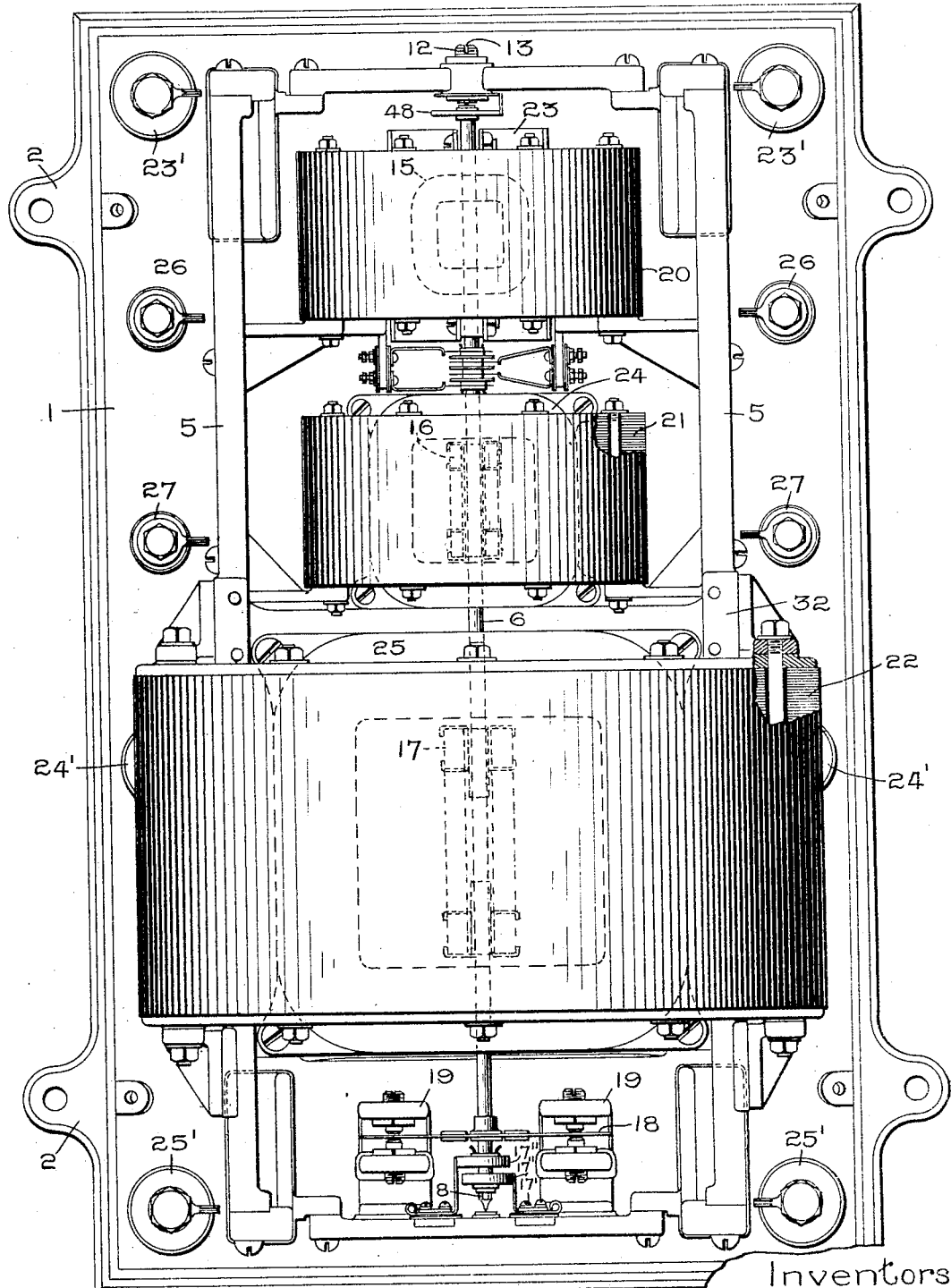
Figure 6:
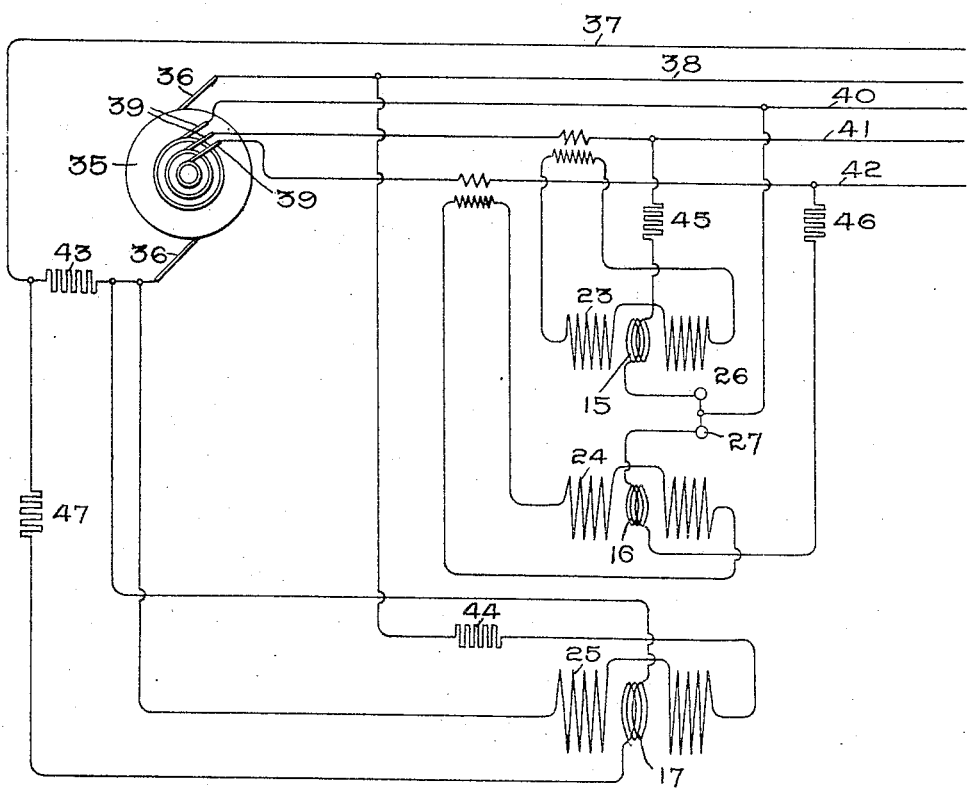

In the accompanying drawings we have illustrated one embodiment of our invention. Of the drawings, Figure 1 is a side elevation, partly in section. Fig. 2 is a front elevation, partly in section and partly broken away and with the casing removed. Figs. 3, 4, and 5 illustrate details of construction, and Fig. 6 is a diagram showing the arrangement of the circuits and connections.

The meter mechanism is mounted on a base member 1. The base is preferably formed of metal and may be provided with perforated lugs 2 for securing the meter to the panel of the switchboard or other support upon which the meter is to be mounted. Brackets 3 and 4 project from the front of the base at the top and bottom, respectively, and carry at their outer ends a rectangular frame 5, which may be made up of bars of suitable material, such as copper or brass, joined together in any suitable manner to make a rigid frame for supporting the meter mechanism. Centrally located with respect to this frame is a vertical hollow shaft 6. A supporting member or plug 7 is inserted in the lower end of the hollow shaft 6. (See Fig. 5.) The supporting member is provided with a flange 7', which engages the ends of the hollow shaft and has formed in it a threaded socket into which is screwed a bolt 8. A pin 9 depends from the lower end of the bolt 8 and passes through an aperture formed in a guiding member 10, carried by the lower cross-bar of the supporting-frame 5. The pin 9 and the bearing member 10 may be formed of hardened steel or other suitable material. A perforated jewel may be placed in the member 10, if desired. A wire 11 is secured to the inner end of the supporting member 7 and passes up through the hollow shaft 6. The upper end of this wire is secured in a threaded adjusting member 12, (see Figs. 2 and 4,) which is held in a nut carried by the upper cross-bar of the frame 5. A kerf 13 is formed in the upper end of the threaded block 12, by means of which the block 12 may be rotated in the supporting-nut. A plug 14 is inserted in the upper end of the hollow shaft 6 and is provided with a centrally-located aperture through which the wire 11 passes.

The shaft 6 has secured to it three substantially rectangular coils 15, 16, and 17. These coils are similar in construction except that the coil 17 is somewhat larger than coils 15 and 16, which are of the same size. Each coil is formed in two equal parts, (clearly shown in the drawings,) the shaft passing between the two parts of each coil, so as to obtain a symmetrical relation between the shaft and the coils. The coils are insulated from the shaft and secured thereto in any suitable manner. At the lower end of the shaft a damping-disk 18 is secured in a position to be acted upon by magnets 19, carried by the lower cross-bar of the rectangular frame 5. The damping-disk and coacting magnets are of the usual construction.

The terminals of the coils 15 and 16 are connected to the terminals 15' and 16', respectively, by means of flexible conductors 15" and 16", respectively. The terminals of the coil 17 are connected to terminals 17', carried by the lower cross-bar of the supporting-frame 5 by means of flexible conductors 17". We have not thought it necessary to illustrate the details whereby the terminals of the coils are insulated from one another and from the hollow shaft 6, as these details form no part of our present invention.

Surrounding the coils 15, 16, and 17, respectively, and carried by the supporting-frame 5 in any suitable manner are annular masses of laminated iron 20, 21, and 22. Supported from the frame 5 directly, or from these masses of magnetic material are rectangular coils 23, 24, and 25. These coils surround the coils 15, 16, and 17, respectively, and each coil is divided into two equal parts, the parts of each coil being placed on opposite sides of the shaft 6. The coils are of course properly insulated. The use of the masses of magnetic material is advantageous, as it increases the flux produced by the coils and at the same time protects them from the disturbing action of stray fields and the like.

The terminals of the coils 23, 24, and 25 are secured to binding-posts 23', 24', and 25', respectively, and the terminals 15', 16', and 17' are secured to binding-posts 26, 27, and 28, respectively. These binding-posts are all carried by the base 1, from which they are insulated in the ordinary manner.

The shaft 6 carries an indicating member 29, which extends from between the members 21 and 22. A counterbalance 30 extends rearwardly of a shaft 6 between these members to counterbalance the weight of the indicating member 29. An arc-shaped indicating-scale 31, having supports secured to the supporting-frame 5 at 32, is so located that the wire 29', carried by the indicator-arm 29, travels in front of it, and thus indicates the amount of rotation that may be given to the shaft 6. A casing 33 is secured to the base in any suitable manner and protects the meter from dust. A glass window 34 may be provided in the front of this casing, through which the position of the indicating-wire 29' may be observed.

Referring now to the diagram in Fig. 6, 35 represents a double-current generator or other source of direct and alternating current. Brushes 36 convey direct current from the generator to the lines 37 38. Similarly brushes 39 convey three-phase current to the lines 40, 41, and 42. A resistance 43 is placed in the line 37, and the coil 17 is connected in shunt about this resistance. The coil 25 is connected across from the line 37 to the line 38. A suitable resistance 44 is inserted between the coil 25 and the line 38. The coils 15 and 16 are connected from the line 40 to the line 41 and from line 40 to the line 42, respectively. The coils 23 and 24 are connected to the secondaries of series transformers, the primaries of which are in the lines 41 and 42, respectively. Suitable resistances 45, 46, and 47 are placed in series with the coils 15, 16, and 17, respectively.

The coils 23 24 25 are placed with their axes at right angles to the coils 15 16 17, respectively. In the drawings we have shown the coils 16 and 17 as having their axes parallel with one another, while the axis of the coil 15 is perpendicular to the axes of the coils 16 and 17. This arrangement, however, is not essential.

It will be readily understood that on the passage of current through any of the circuits the movable coil of the element corresponding to that circuit will tend to move into the position in which its axis will coincide with that of the fixed coil corresponding thereto, and if the coils are set up so as to have an additive effect the passage of current through either or both of the other circuits will increase the turning tendency. The principal resistance to turning of the shaft 6 is that given by the torsion of a spiral spring 48, carried at the top of the shaft 6, assisted more or less by the torsion of the wire 11. The leading-in conductors 15", 16", and 17" may be spiral springs arranged to assist the spring 48 and wire 11, or not, as desired. The coils are so proportioned that the consumption of equal amounts of energy in any circuit will produce an equal amount of turning moment upon the shaft. By adjusting the resistances 44, 45, 46, and 47 this adjustment can readily be obtained. It will be readily apparent to all skilled in the art that when these coils are properly adjusted the total energy consumed in the three-phase alternating-current system and in the direct system will be added up by the three elements and correctly indicated by the indicator 29' and dial 31.

What we claim as new, and desire to secure by Letters Patent of the United States, is—

1. In a measuring instrument, a movable measuring element, a plurality of conductors, means responsive to the flow of direct current in one of said conductors for moving said element, and means responsive to the flow of alternating current in another of said conductors for also moving said element.

2. In combination, a dynamo-electric machine simultaneously supplying direct and alternating current to supply systems, and a single measuring instrument having a single indicating device for indicating the total output of the machine.

3. In a measuring instrument, a movable member, a plurality of coils carried thereby, and one or more fixed coils corresponding to each of the movable coils, some of said coils being responsive to direct current and others to alternating current.

4. In a measuring instrument, a hollow vertical shaft, a member inserted in one end of said shaft, a wire or rod secured to said member and passing upward through the shaft, means for securing the upper end of said wire beyond the end of said shaft, a plurality of coils carried by said shaft, means for connecting one of said coils to a source of direct current, and means for connecting another of said coils to a source of alternating current.

5. In a system of distribution having a branch conveying direct current and a branch conveying alternating current, a single movable member, means responsive to the consumption of energy in the alternating-current branch for moving said member, and other means responsive to the consumption of energy in the direct-current branch for moving said member, said means being so proportioned that equal amounts of energy consumption in the direct-current branch and in the alternating-current branch produce equal movements of the member.

6. In a measuring instrument, a support, a torsion member extending therefrom, a stiff hollow shaft, a member connected to said shaft at one end, said torsion member passing through said hollow shaft and being secured to said member, a bearing, means carried by said member coöperating with said bearing to position said shaft, a plurality of electric-current responsive devices carried by said shaft, a direct-current circuit coöperating with one of said members, and an alternating-current circuit coöperating with another of said members.

7. In a measuring instrument, a movable member, a plurality of dynamometer-coils carried thereby, and means for supplying some of said coils with direct current and others of said coils with alternating current.

8. In combination, a generator giving both direct and alternating current, a single measuring instrument having a movable member, means responsive to the direct current given by said generator for moving said member, and separate means responsive to the alternating current given by said generator for also moving said member.

In witness whereof we have hereunto set our hands this 17th day of January, 1903.

FRANK P. COX.
WILLIAM H. PRATT.

Witnesses:
DUGALD McK. McKILLOP,
JOHN A. McMANUS.